United States Patent [19]
Fleming

[11] Patent Number: 4,787,036
[45] Date of Patent: Nov. 22, 1988

[54] STUDENT ENROLLMENT STABILIZATION SYSTEM

[76] Inventor: Patrick J. Fleming, 1321 McLaughlin Rd., Pittsburgh, Pa. 15241

[21] Appl. No.: 868,643

[22] Filed: May 29, 1986

[51] Int. Cl.$^4$ .......................................... G06F 15/21
[52] U.S. Cl. .................................................. 364/401
[58] Field of Search ........................................ 364/401

[56] References Cited

PUBLICATIONS

"New Ways to Fund a College Education", 'U.S. News & World Report', Feb. 3, 1986, pp. 56–57, A. McGrath.
Irwin Ross, "Why College Bills Don't Level Off", Fortune, Sep. 30, 1985, pp. 66–71.

Primary Examiner—Jerry Smith
Assistant Examiner—Gail O. Hayes
Attorney, Agent, or Firm—Trask, Britt & Rossa

[57] ABSTRACT

Data processing for an improved student population maintenance system for educational institutions predicts number of students for a target year, costs for target year, revenues for target year, tuition charges for a target year, marginal costs for each student in a target year, checks for internal accuracy and consistency compared to predetermined norms, calculates "scholarship" fee for prospective students at present value, checks for statistical validity. On a periodic basis, e.g. daily, present value of future tuition is recomputed to determine new scholarship fee for particular institution. Brokerage system for several institutions is also disclosed.

11 Claims, 3 Drawing Sheets

STUDENT ENROLLMENT STABILIZATION SYSTEM

BACKGROUND OF THE INVENTION

1. Field:

This invention relates to data processing methodology and, more specifically, to data processing methodology for effecting a student population maintenance system at an educational institution.

2. State of the Art:

Currently, educational institutions (institutions) rely on various techniques for maintaining or increasing their entering student population size (student enrollment). Such techniques include various advertising methods such as mailing brochures to potential candidates, advertising in periodicals, speaking at local high schools, actively recruiting gifted students, and alumni recruiting efforts. The techniques also include financial incentives such as scholarships and other financial aid programs.

These techniques are relatively effective when the institution's pool of potential candidates for admission is relatively large. They were developed when the United States population was increasing, and hence the pool of potential applicants was also increasing. When the pool of potential candidates for admission to the institution decreases, e.g., due to declining birth rates or a downturn in the economy, these techniques prove inadequate to maintain the institution's optimal student population size.

A small pool of potential candidates is particularly troublesome to smaller institutions. These institutions are generally privately endowed as opposed to their state run counterparts which receive substantial public funding. As such, smaller institutions generally do not have the necessary funds to use the traditional techniques of student population maintenance most effectively. In some instances, use of the traditional techniques can even increase the institution's financial problems. If small institutions are to maintain optimal student population size, they must use other more efficient methods to attract more students to their institutions.

If an institution cannot effectively maintain its student enrollment, the institution then has to consider more difficult choices. Lowering admission standards for enrolling students might increase the number of applicants; however, such a technique is obviously undesirable. The institutions can attempt to raise non-tuition money in order to maintain itself, such as through endowments or gifts. However, the institution will then be competing with other organizations for a limited amount of funds. The institution can decrease its student body size and offer a smaller variety and number of classes in order to contain costs. These actions, however, can decrease the institution's quality and discourage students seeking education in the discontinued areas of the curriculum.

Another problem faced by both large and small institutions, but particularly by small institutions, is increasing tuition costs at the institutions. Increased tuition costs decrease further the number of potential candidates who might enroll at an institution. These increased tuition costs decrease enrollment at small institutions more than at large institutions since small institution tuition cost increases are generally greater than the large institutions' tuition cost increases and are increasing at a faster rate.

The current alternatives for maintaining student enrollment are either too costly or inherently not viable due to restrictions such as faculty tenure, facilities with limited utility and small resale value.

SUMMARY OF THE INVENTION

The invention is an educational student enrollment maintenance system to be used by educational institutions during periods of declining enrollment. To implement the system, the participating educational institution (institution) gathers the following information: (1) the institution's historical full day student enrollment (the number of full-time day students attending the institution not including transfer students or others who did not enroll as freshmen) over a specified number of years in the past; (2) the retention rate of these students over their expected enrollment period; (3) the institution's market area's demographics over the same specified number of years; (4) the institution's annual investment earning's rate over the specified number of years; (5) the institution's tuition rates for the specified number of years in the past, including charges, scholarships, university supported financial aid and allowances or removals for bad debts; (6) the institution's total student enrollment capacity both presently and in the future; and (7) the cost of operating the institution over a specified number of years in the past.

This information is entered into data processing equipment (e.g., a computer) where it is stored in the equipment's memory files. Subsequently, a series of tests is performed on the above information. These tests check the data for accuracy and internal consistency. If need be, the data is then corrected so that no internal inconsistencies exist, and then the data is re-entered into the data processing equipment's memory files.

Subsequently, a series of calculations is performed on the stored information. The ratio of the institution's historical full tuition student enrollment to the institution's market area's historical demographics is then calculated (i.e., the institution's market share). A simulation is then performed by the data processing equipment which forecasts the future demographics of the institution's market area over a number of years. The predicted demographics for a given year is multiplied by the institution's percentage market share to predict that given year's full tuition student enrollment at the institution.

Further simulations are performed on the data processing equipment. One simulation predicts the prior years' tuition increases into the future using standard techniques. The data processing equipment then predicts the institution's annual future revenues for a particular year (the target year) by multiplying the institution's predicted future full tuition student enrollment for the target year by the institution's predicted future full tuition amount for the same year. Another simulation is performed on the data processing equipment which forecasts the institution's annual future costs for any given year.

The institution's annual shortfall for the target year is then predicted by subtracting the institution's annual future revenues from the institution's annual future costs for the target year. The institution's annual shortfall is then divided by the institution's predicted tuition amount for the target year to determine the added number of students needed for the institution to operate without experiencing a loss.

A "student scholarship population size" is then calculated by the data processing equipment.

The institution's annual marginal cost area for a target year is then predicted by adding the institution's fixed costs to the institution's variable costs based upon the institution's predicted student enrollment for the target year. The institution's break even point is then calculated. The institution's break even point for a target year is then divided by the predicted tuition rate for the same target year to determine the number of students needed for the institution to operate without a loss (i.e. break even). This number of students is then subtracted from the total student enrollment capacity for the target year. The resulting number is the number of students in the institution's marginal cost area. In the institution's marginal cost area, the institution continues accepting applicants so long as the applicant's acceptance adds more to the institution's revenues that it adds to the institution's costs. The institution's optimal enrollment is that number of students required in order for the institution to have marginal costs equal to marginal revenues.

The total costs associated with accepting the students needed to meet the institution's optimal enrollment is then combined with the institution's break even point for the target year. The resulting dollar amount is the institution's income goal for the target year. The institution's income goal is adjusted by the expected retention rate and then discounted to present value using a specified earnings rate for each target year.

The institution's discounted income goal is then divided by the optimal student enrollment for each target year. The resulting figure is the institution's discounted average cost per student for the target year.

The institution's predicted full tuition amount for the target year is also discounted to present value using the specified earnings rate for the particular target year. The institution's discounted average cost per student for the target year is averaged with the institution's discounted full tuition amount for the target year to come up with the yearly per student future scholarship fee for a target year. The yearly per student future scholarship fee is the amount the institution would presently charge a prospective student to meet the student's tuition amount for the target year.

The per student scholarship fee for consecutive target years, starting with the student's expected matriculation year and ending with the student's graduation year is summed up to determine the per student scholarship fee for an entire education at the institution.

Potential candidates for future admission to the institution are then solicited. They are offered positions in the future class they would most likely matriculate in at the per student scholarship fee for the years they might desire to attend.

Another aspect of this invention is the possibility of setting up a data processing system for supporting a student enrollment brokerage system. In the brokerage system, a central brokerage agency could buy, sell and trade student scholarship slots at various institutions. In such a system, a scholar holding a four (4) year education at college X, but desiring to go to college Y, could trade through the brokerage system his slot at college X for a slot at college Y. The data processing methodology would do the book keeping necessary for keeping track of the available slots at the various institutions.

DESCRIPTION OF THE ILLUSTRATED EMBODIMENTS

Figure 1A:
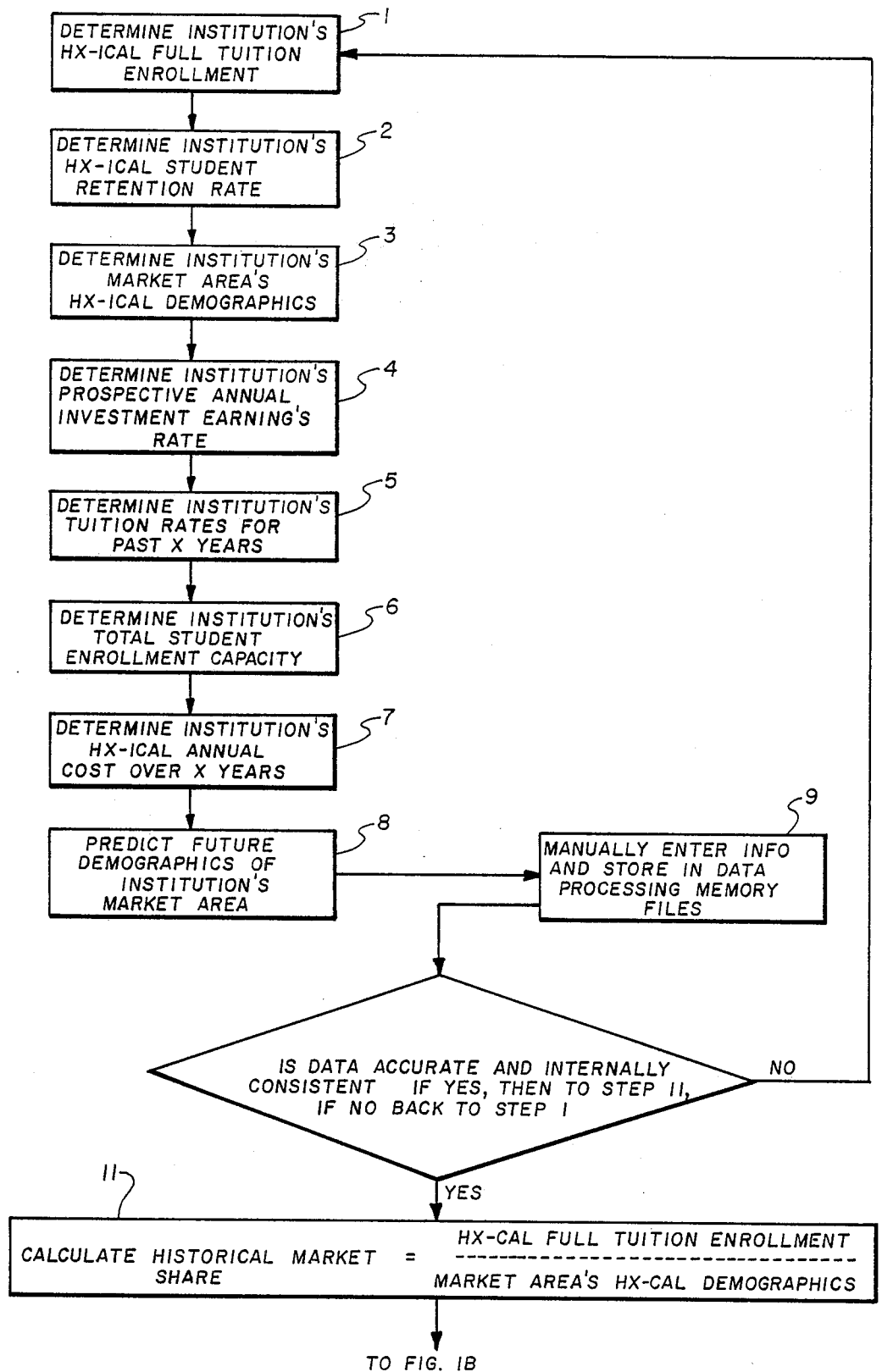
FIGS. 1A, 1B 1C are, respectively, the upper, middle and lower portions of a schematic flow chart depicting the data processing methodology and structure in accordance with the principles of the present invention for a student population maintenance system.
Figure 1B:
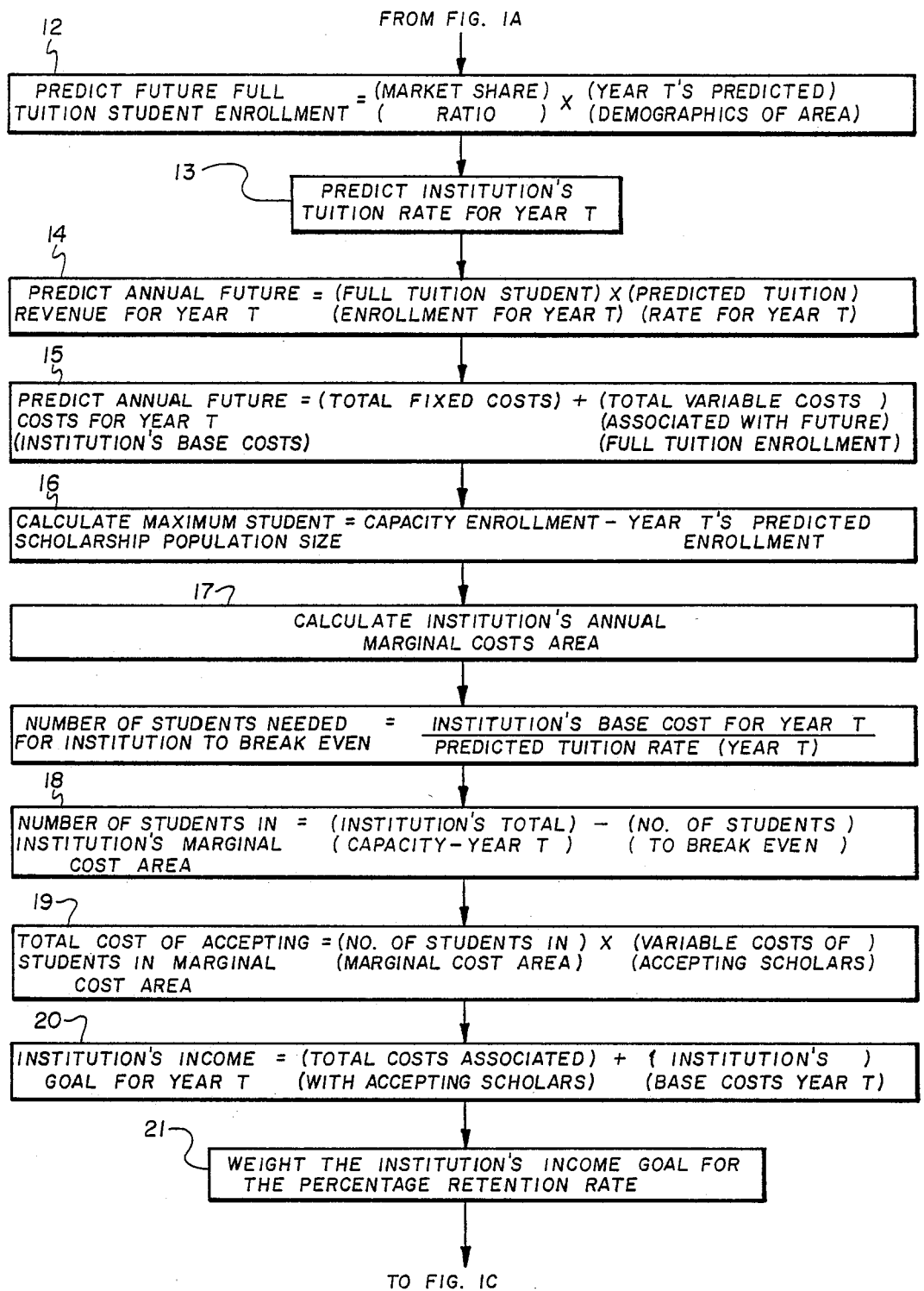
Figure 1C:
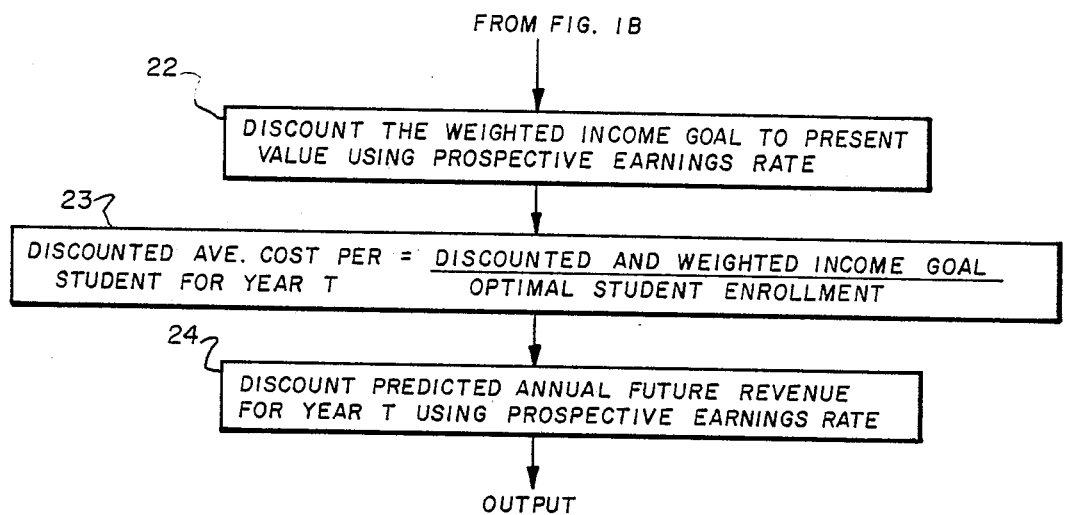

FIG. 1 shows in overall scope a data processing and system operational flow chart for implementing a student population maintenance system at an institution incorporating the principles of the invention. Those skilled in the art will readily appreciate that the flow chart shown in FIG. 1 can be readily adapted for use with modern digital computer equipment.

Initially, the institution gathers information necessary for the implementation of the invention. The institution must first determine its historical full tuition enrollment 1. Historical full tuition enrollment is the number of full-time day students attending the institution per year over a specified number of years, but does not include transfer students or others who did not initially enroll as freshmen. The institution then determines the historic retention rate of students over their expected enrollment period 2. This information is generally available from records which the institution maintains.

The institution then determines its market area's historical demographics 3. The institution's market area is defined as the geographic area from which the institution normally attracts the majority of its potential candidates. For colleges, universities, and technical schools, the potential candidates are generally graduating secondary school students. For secondary schools, the potential candidates are generally graduating elementary school students, and for elementary schools, the potential candidates are generally pre-schoolers. The geographic market area for colleges, universities, and technical schools is generally larger than the geographic market area for secondary and elementary schools.

The institution can determine its geographic market area with relative accuracy by taking a statistically valid representative random sampling of the home addresses of its student population and by plotting these addresses on a map. The distribution will presumably be concentric with the greatest number of students coming from a limited geographic area around the institution. Fewer students would be found farther away from the institution.

After the geographic market area is determined, the institution can then ask various government agencies; e.g., the Census Bureau or a state department of vital statistics, for the institution's geographic market area's demographics for the same time period used when determining the institution's historical full tuition enrollment, 1.

The institution must then determine its prospective annual investment earnings rate 4. The prospective annual investment earnings rate is the average annual rate of return the institution can earn on investments in the future. This number could be the current effective yield on zero coupon bonds which mature sometime in the future, or the average annual return on investment the institution has realized in the past. If the institution used its average annual return in the past, the time period used should be similar to the period used in determining the historical full tuition enrollment 1, the historic retention rate 2 and the institution's market area's historical demographics 3.

The institution then determines the annual amount charged students for tuition over a specified time period 5. This information is generally readily available from the institution's records, and again should cover a time period similar to the above determinations 1-4. In determining this number, the institution must take into consideration charges, scholarships, institutionally supported financial aid and allowances or removals for bad debts.

The institution next determines its total student enrollment capacity 6. In making this determination, the institution must consider its number of faculty, the number of buildings available, the remaining useful life of the available buildings, its library size, and the likelihood of obtaining new facilities in the future. This determination 6, unlike the above determinations 1-5, must both be determined for the present and for the future. The time period to be covered by the future determination should be at least eighteen years for universities, colleges, and technical schools, since that is the maximum time period before the youngest potential candidates will matriculate at those institutions.

The institution's historical annual costs over a specified number of years must be determined 7. This information is generally readily available from the institution's records. The time period covered should be similar to the time periods used in the above determinations 1-5. The institution should divide its historical annual costs into fixed costs and variable costs.

The institution's market area's demographics are then predicted for a number of years in the future 8. Again, this information is generally available from various governmental agencies (e.g., the Census Bureau and various state and city agencies), or can be determined by taking a representative polling of potential candidates. Universities, colleges, and technical schools can survey secondary and elementary schools in their geographic market area to determine the number of potential candidates. Elementary schools can be surveyed by secondary schools to determine the number of students who might matriculate at those institutions.

The above information 1-8 must then be manually entered into data processing equipment 9. The data processing equipment can be any computer system with sufficient memory to store the information in its data files, while retaining enough memory to perform calculations on the information. The manual entry will generally be performed on a keyboard. The keyboard is in contact with a central processing unit (CPU) which routes the manually entered information to the data processing equipment's random access memory (RAM) to be stored for later use.

Tests are performed on the entered information. The entered data is checked for accuracy and internal consistency 10. Retention representations are compared to prior enrollment figures. Enrollment and financial projections are compared against inherent restraints, such as the institution's total student enrollment capacity. If need be, the data is corrected and re-entered into the data processing equipment's memory files.

A determinstic model of the instituting conformation is then developed by the data processing equipment.

The data processing equipment calculates the ratio of the educational institution's historical full-tuition enrollment to the educational institution's market area's historical demographics (i.e., the institution's historical market share) 11 over a specified number of years in the past. This calculation 11 is performed by dividing the institution's historical full-tuition enrollment 1 by the institution's market area's historical demographics 3 for each year over a certain number of years in the past. The market share can generally be expressed as a percentage or as some number less than one.

The average historical market share can be determined by dividing the sum total of the institution's market share over the past specified number of years by the specified number of years.

A predicted future market share for a year can be determined by various methods of forecasting or simulations. Acceptable methods of forecasting include simple extrapolation, least squares regression forecasting, moving average forecasting, and exponential smoothing forecasting. These and other forecasting methods are well known to those skilled in the art, and are meant to be illustrative, not exhaustive.

The data processing equipment then predicts a target year's future full tuition student enrollment 12. A target year is the year that a potential candidate would most likely matriculate at the institution. For example, the target year at a university for a child born in August of 1979 would be 1997, since that is the year the child would most likely attend the university. If the same child desired to attend a university for four full years, the target years would be 1997, 1998, 1999, and 2000.

The data processing equipment predicts the future full tuition student enrollment by multiplying either the average historical market share 11 or the predicted market share for the target year using one of the methods described above, by the target year's predicted future demographics of the institution's market area 8. The resulting number may be reduced by a factor to compensate for a student scholarship population size 16, as is more fully discussed below.

The data processing equipment then predicts the institution's tuition amount per student for the target year 13. This prediction is accomplished by applying one of several accepted forecasting or simulation techniques to institution's prior years' tuition data 4, for example, simple extrapolation, least squares regression forecasting, moving average forecasting exponential-smoothing forecasting, or just determining an average annual increase are all acceptable forecasting techniques.

The data processing equipment next predicts the institution's annual future revenue for the target year 14. This prediction is accomplished by multiplying the educational institution's future full tuition enrollment for the target year 12 by the educational institution's predicted future full tuition amount per student for the target year 13.

The data processing equipment must then predict the institution's annual future costs for the target year 15. Again, the above-described accepted methods of forecasting can be applied using the institution's prior years' annual costs 7 to determine predicted fixed and variable costs for a target year. The variable costs would be based on the predicted future full tuition student enrollment 12.

A maximum student scholarship population size is then calculated by the computer 16. A "student scholar" is a student enrolled in the institution by the student population maintenance system. The institution's predicted future full tuition student enrollment for the target year 12 is subtracted from the institution's total student enrollment capacity for the target year 6, leaving the desired student scholarship population size.

Of course, some of the students enrolled by the student enrollment stabilization system would have been students who would have normally enrolled at the institution without the system, so some downward adjustment in the future full tuition student enrollment prediction 12 should be performed.

The institution's annual marginal cost area for a target year is then predicted 12. The sum of the predicted fixed costs and the predicted variable costs for the target year 15 is the amount of funding needed by the institution to finish the target year without a loss (i.e., the break-even point or the institution's base cost). The base cost 15 for a target year is then divided by the institution's predicted tuition rate for the same target year 13 to determine the number of full tuition students needed for the institution to break even 17. The number of students needed for the institution to break even 17 is then subtracted from the total student enrollment capacity for the target year 6. The resulting number is the number of students in the institution's marginal cost area (i.e. the optimal number of student scholars). In the institution's marginal cost area, the institution will continue accepting applicants so long as the acceptance of the applicant adds more to the institution's revenues that it adds to the institution's cost. The institution's optimal enrollment is that number of students required so that the institution has marginal costs equal to marginal revenues.

The total costs associated with accepting the students needed to meet the institution's optimal enrollment is then calculatd 19. These costs are combined with the institution's base cost 15 for the target year 20. The resulting dollar amount is the institution's income goal for the target year. The institution's income goal is adjusted by the expected retention rate 21. The institution's income goal is then discounted to present value using a specified earnings rate for each target year 22.

The institution's discounted income goal is then divided by the optimal student enrollment for each target year 23. The resulting figure is the institution's discounted average cost per student for the target year.

The institution's predicted annual future revenue for the target year 14 is also discounted to present value using the specified earnings rate for the particular target year 24.

The per student future scholarship fee is then computed. In one mode, the institution's discounted average cost per student for the target year is averaged with the institution's discounted annual future revenue for the target year to come up with the per student future scholarship fee for a target year. The per student future scholarship fee is the amount the institution presently charges a prospective student to pay the student's tuition amount for the target year.

In another mode, a per student future scholarship fee is calculated for a target year by dividing the institution's annual marginal costs for accepting the students by the student scholarship population size for the target year.

An alternative method for determining the per student scholarship fee for a target year is by merely discounting to present value the institution's predicted full tuition costs per student for the target year 13.

The data processing equipment may be used to then develop a probabilistic model. The probabilistic model is identical to the deterministic model but applies standard deviations to all of the independent variables (e.g., tuition rate changes, enrollment, etc.) and uses a log normal distribution. It then performs a Monte Carlo simulation of this model to simulate potential results that could occur with random values of the variables in a thousand iterations. The result is then tested for goodness of fit for log normal distribution using the chi square test and others. This final run allows the institution to view the sensitivity of the model to the inputs and potential changes. The institutions may, at this point, adjust the pricing for the scholars to suit by using values developed at some cumulative probability in the table of value distributions (i.e., a value at which point all results are below "x" cumulative probability).

For a four year education at an institution, the total amount presently due using whatever method is determined for each applicable target year and then combined for a total amount presently due.

Enacting student enrollment stabilization programs at different institutions allows for setting up a student enrollment stabilization brokerage system. In such a system a student who holds a four (4) year education at college X (i.e. a scholar of college X) could trade the college X education through the brokerage system for an education at college Y.

Data processing means would be used to do the book keeping needed to keep track of the available slots in various institutions mch like a computerized securities system.

The data processing equipment's account data file means would store information characterizing the various institutional accounts. Data receiving means would receive information from the various institutions and brokers of student scholarship slots concerning sales of the scholarships slots. The information contained within the data processing equipment's memory files must be capable of updating by manual entry means or by means responsive to the data receiving means.

The data processing equipment must also be able to calculate a student scholarship size and student scholarship fee as disclosed above for the various institutions. Manual entry means for entering student scholarships orders at various institutions must also be present, so that a user could debit and update available student scholarship population slots at various institutions. The data processing equipment must then be in communication with the instiutions and brokers selling the student scholarship population slots so that the institutions and brokers do not oversell slots.

The above described arrangements are merely illustrative of the present invention's principles. Numerous adaptations and adaptations thereof will be readily apparent to those skilled in the art without departing from the scope and spirit of the present invention.

I claim:

1. A student enrollment stabilization system for an educational institution comprising:
    means for determining a ratio of an educational institution's historical full tuition student enrollment to the educational institution's market area's historical demographics; means for calculating future demographics of the educational institution's market area for a target year;
    means for calculating said target year's future full tuition student enrollment by multiplying said ratio by said calculated future demographics for the target year;

means for calculatiing a tuition amount per student for said target year;

means for calculating annual future revenue for said target year by multiplying said full tuition amount per student for the target year;

means for calculating a total student enrollment capacity for an educational institution;

means for subtracting a present year from a target year; means for calculating a student scholarship population size for a target year by subtracting the predicted full tuition student enrollment for the target year from said total student enrollment capacity;

means for calculating annual future costs for said target year based upon said total student enrollment capacity for said target year;

means for calculating an annual break even point of said educational institution for a target year from said annual future costs and said annual future revenues for said target year; and means for calculating a per student future scholarship fee for a target year using said calculation means;

means for advertising, promoting and distributing positions in said target year's student scholarship population size, each said position being distributed at a fee approximating said per student future scholarship fee, said distribution not exceeding numerically said target year's student scholarship size.

2. The student enrollment stabilization system of claim 1 wherein the per student scholarship fee is determined for the target matriculation year and three subsequent target years.

3. The student enrollment stabilization system of claim 1 including means for statistically validating one or more of the calculations obtained from said calculation means.

4. The student enrollment stabilization system of claim 3 wherein said means for calculating is data processing equipment.

5. A student population maintenance system for an educational institution comprising:

data file means for storing an educational institution's historical full tuition student enrollment, an educational institution's market area's historical demographics, an educational institution's historical annual investment earning's rate, and an educational institution's total student enrollment capacity;

manual entry means, connected to said data file means, for entering the educational institution's historical full tuition student enrollment, the educational institution's market area's historical demographics, the educational institution's historical annual investment earning's rate, and the educational institution's total student enrollment capacity into the data file means;

data verification means associated with said data file means, for verifying data input into said data file means by said manual entry means for internal consistency and accuracy;

calculating means for associated with said data file means for generating a ratio of the educational institution's historical full tuition student enrollment to the educational institution's market area's historical demographics;

means for calculating a student scholarship population size for a target year by subtracting a predicted future full tuition student enrollment for the target year from the educational institution's total student enrollment capacity;

means for calculating an educational institution's annual marginal cost for a target year from the educational institution's annual future cost and the educational institution's annual future revenue for said target year;

means for calculating a per student future scholarship fee for a target year; and means for advertising, promoting and distributing positions in said target year's student scholarship population size, each said position being distributed at a fee approximation said per student future scholarship fee, said distribution not exceeding numerically said target year's student scholarship size.

6. A student population maintenance system comprising:

account data files means for storing current information characterizing individual institutional accounts;

data receiving means for receiving information from a plurality of institutions and from a broker of student scholarship positions;

transmission means linking said account data file means to said data receiving means for transmitting information from said data receiving means to said account data file means and thereby updating said information in said account data file means;

computational means electronically associated with said account data file means, for computing a student scholarship population size for an institution for a target year and for computing a student scholarship fee for said target year based on said institution's marginal costs for said target year;

manual entry means associated with said account data file means and computational means for entering a student scholarship order for an institutional account;

debiting means associated with and responsive to said manual entry means for debiting said student scholarship population size for a target year and for updating said student scholarship population size; and communicating means to communicate said updated available student scholarship population size, to said broker and to said institutions;

means for advertising, promoting and distributing positions in said target year's student scholarship population size, each said position being distributed at a fee approximating said per student future scholarship fee, said distribution not exceeding numerically said target year's student scholarship size.

7. A method for increasing an educational institution's student enrollment in a target year comprising:

determining a ratio of an educational institution's historical full tuition student enrollment to said educational institution's market area's historical demographics;

calculating future demographics of the educational institution's market area for a target year;

calculating said target year's future full tuition student enrollment by multiplying said ratio by said future demographics for the target year;

calculating the full tuition amount per student for the educational institution for the target year;

calculating annual future revenue for the target year by multiplying said future full tuition student enrollment for said target year by said predicted future full tuition amount per student for said target year;

calculating a total student enrollment capacity for an educational institution for the target year;

calculating a student scholarship population size for the target year by subtracting the predicted future full tuition student enrollment for the target year from said total student enrollment capacity;

calculating the annual future costs of an educational institution for the target year based upon the capacity enrollment;

calculating a break even point of the educaitonal institution for the target year from said annual future costs and said annual future revenues for said target year;

calculating a per student future scholarship fee for the target year; and means for advertising, promoting and distributing positions in said target year's student scholarship fee, said distribution not exceeding numerically said target year's students scholarship size. thereby increasing said educational institution's enrollment for said target year.

8. The method according to claim 7 wherein said student scholarship fee for a target year is calculated by dividing an educational institution's total fixed and variable costs for a target year by the total student enrollment capacity for the target year.

9. The method according to claim 7 wherein said student scholarship fee for a target year is calculated by dividing an educational institution's variable costs associated with teaching a student scholarship population by the student scholarship population size.

10. The method according to claim 7 wherein said student scholarship fee is calculated for the target year and three subsequent years.

11. The method according to claim 7 wherein said calculations are performed on data processing equipment.

* * * * *